M. W. HOGLE & W. W. SLICK.
PLATE ROLLING APPARATUS.
APPLICATION FILED MAY 21, 1906.
947,428.
Patented Jan. 25, 1910.
4 SHEETS—SHEET 1.
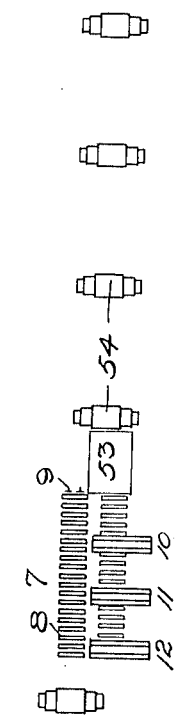
FIG. 1
FIG. 2
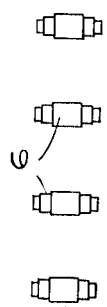
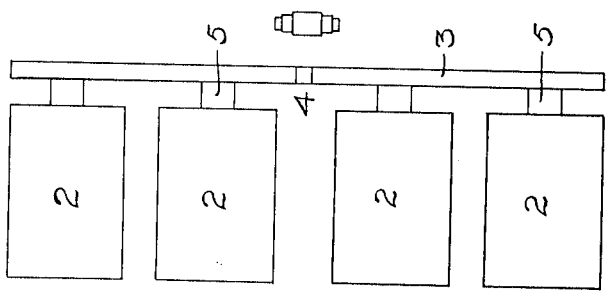
WITNESSES.
INVENTORS.

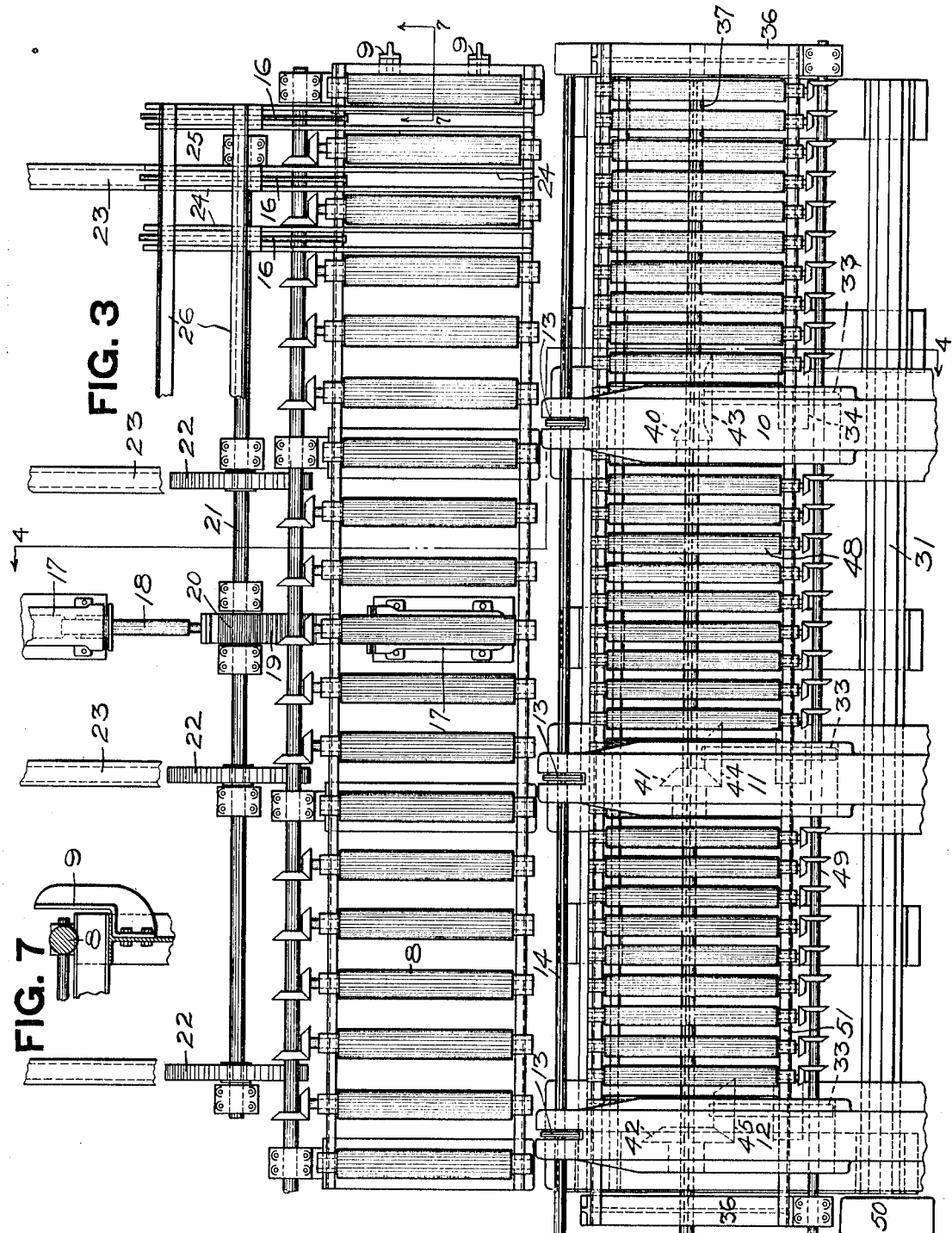

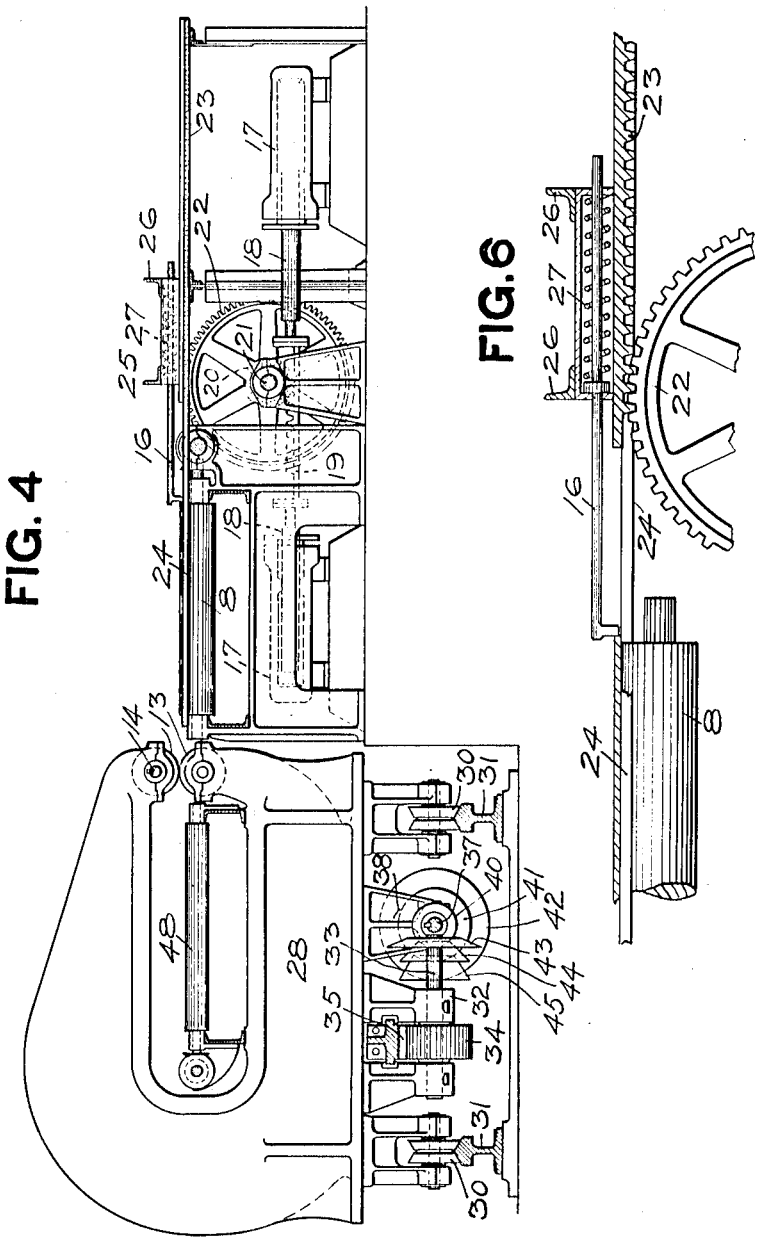

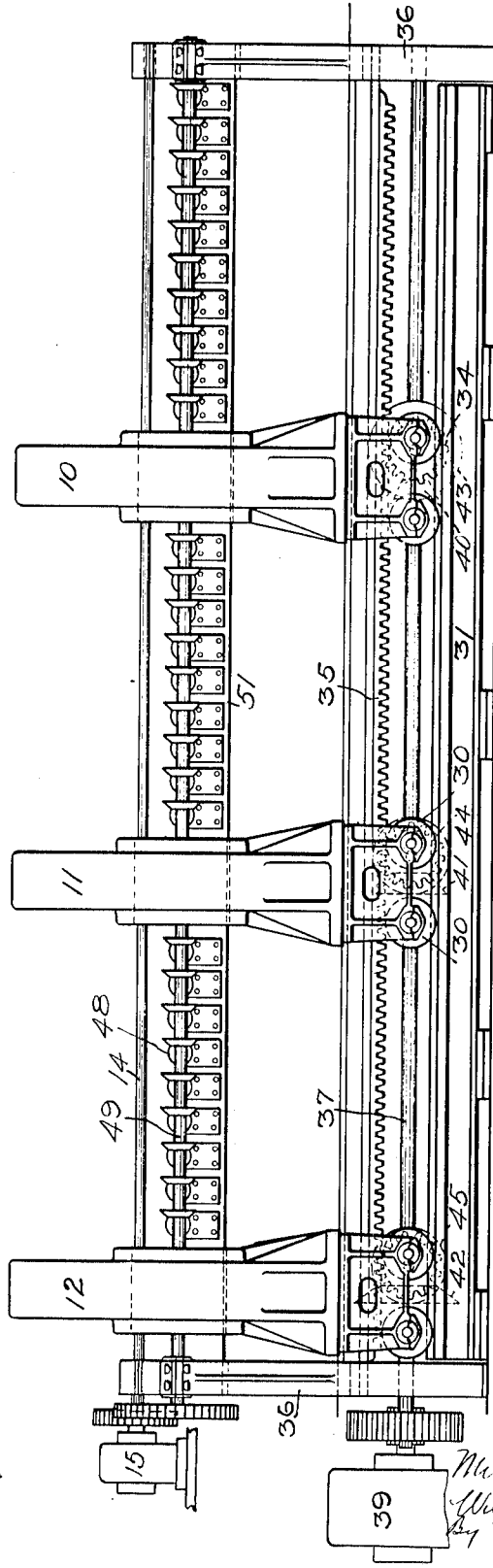

UNITED STATES PATENT OFFICE.

MILTON W. HOGLE AND WILLIAM W. SLICK, OF PITTSBURG, PENNSYLVANIA, ASSIGNORS TO PERCY E. DONNER, OF PITTSBURG, PENNSYLVANIA.

PLATE-ROLLING APPARATUS.

947,428.  Specification of Letters Patent.  Patented Jan. 25, 1910.

Application filed May 21, 1906. Serial No. 318,011.

*To all whom it may concern:*

Be it known that we, MILTON W. HOGLE and WILLIAM W. SLICK, residents of Pittsburg, in the county of Allegheny and State of Pennsylvania, have invented a new and useful Improvement in Plate-Rolling Apparatus; and we do hereby declare the following to be a full, clear, and exact description thereof.

This invention relates to apparatus for rolling metal plates and more especially to apparatus for rolling and cutting black plate while still hot to divide the same into equal parts and remove the crop end.

The object of the invention is to provide apparatus whereby the scrap loss incident to continuous mill practice is very greatly decreased and the sheets produced are all of uniform gage.

According to the ordinary practice of rolling black plate a number of plate bars of a length equal to the width of the plate to be produced, plus a small amount to allow for side scrap, and usually from three-eighths to five-eighths of an inch in thickness and eight inches wide are heated in a pile in a furnace and rolled down one after the other and then piled for further rolling. The objections to this are that since the bars are heated in a pile they cannot be heated uniformly and are at different temperatures on entering the rolls and the hotter bars are necessarily drawn out to a greater length and thinner gage than the cooler bars. This means that the plates entering the matcher to be piled are of different lengths and different gages, and in continuous mills now in operation it has been noted that there is never less than six inches difference between the longest and shortest plate. Since the actual usable length is that of the shortest plate all portions of the longer plates extending beyond the rear end of the shortest plate are useless and might just as well be sheared off at the time of matching as later on. 'Each plate also has a ragged rear or crop end which must be sheared off and these and the excess length of the longest plates produce a very large amount of scrap. Furthermore, in this practice there is always a slight interval of time between the rolling of the first and last bars, and it frequently happens that there is quite a long lapse, so that even if the bars were originally heated uniformly they would not be of uniform temperature on entering the matcher, and consequently when they leave the matcher the bottom one is very much cooler than the others. The consequence is that in rolling down the pack the hotter plates tend to reduce to a thinner gage than the colder ones. Uniformity in gage is impossible with present continuous mill practice and the loss due to scrap is excessive.

Our invention is intended to overcome these defects. Briefly stated, it consists in the combination and operation in succession in the order named of a continuous roughing reducing train, a plurality of cutting mechanisms equally spaced apart for severing a long plate into uniform lengths, a matcher for piling and matching the severed sheets, and a second continuous reducing train, the operation being that in place of using the ordinary 8 inch bar our apparatus enables the use of a 16, 24 or 32 inch bar, as the case may be, which in the first train is reduced to a long plate or partially reduced bar and is then cut to divide it into sections of uniform length, and to remove the single crop end, this operation being simultaneous for all sections, so that they enter the matcher at the same temperature and are of uniform lengths and gage; consequently in the further reduction are all reduced an equal amount, thus producing plates of uniform gage.

In the accompanying drawings Figure 1 is a diagrammatic plan view of our improved apparatus; Fig. 2 is a diagrammatic view of same in side elevation; Fig. 3 is a plan view of the shearing mechanism; Fig. 4 is a transverse vertical section of the same on the line 4—4, Fig. 3; Fig. 5 is a side elevation of the same; and Figs. 6 and 7 are detail views.

In the drawings 2 represents a series of heating furnaces in which the slabs or long bars are heated. In front of these furnaces are conveyers or feeding tables 3 leading to a common receiving table 4. Inclines 5 lead from each furnace to the conveyers or feeding tables 3. The roughing or first reducing rolls are shown as a continuous mill composed of six stands of two high rolls 6. Suitable conveying tables or mechanism will be provided for feeding the bars through these roll stands in succession. In line with this continuous mill is a conveyer 7, preferably a table having a series of live rollers 8, such as are well known in rolling mill practice. At the front end of this roller table are stationary stops 9 against which the forward end of the partially reduced bar strikes. Arranged at the side of the roller table 7 are a series of cutters for severing the long plate into sections of uniform length and to remove its rear or crop end. The drawings show three such cutters 10, 11 and 12. Each cutter may be a saw or other cutter and is shown as consisting of rotary slitting shears or disks 13 one above the other and one or both of which is positively driven, the drawings showing the top disks connected to a shaft 14 which is driven from any suitable source of power, such as from the motor 15. The plate is transferred to these cutters by pushers 16 operating across the roller table 7 and actuated by any suitable mechanism. The drawings show for this purpose a pair of single-acting power cylinders 17 whose piston rods 18 are connected to a rack bar 19. The latter meshes with a pinion 20 on a shaft 21 extending longitudinally of the roller table. This shaft has secured thereto a number of toothed wheels 22 which engage racks 23 on slides 24 mounted on suitable guides 25 extending transversely of the roller table. These slides are connected by the longitudinally extending angle bars 26 and carry compression springs 27 to which the pushers 16 are connected. The springs permit the pushers to yield in case their forward ends strike the shears or other obstruction. As many shears will be employed as necessary to sever the partially reduced bar into the desired number of sections. In most sheet mill practice the packs consist of two or three sheets. Consequently three shears will ordinarily be found to be sufficient, although the number may either be two or any number greater than three. In order to adapt these shears to plates of varying length, as are bound to occur due to different heats of the slabs or bars, or to different weights or sizes of bars, the said shears are shiftable longitudinally of the roller table so that the entire plate, no matter what its length, will be divided into a number of sections of equal length. To permit of this each pair of shears is mounted in a housing or frame 28. These frames are provided with wheels 30 running on rails or tracks 31 on the mill floor. Depending from these frames are hangers or pillow blocks 32 in which are mounted transverse shafts 33, each provided with a gear 34 meshing with a rack 35 which is held stationary by having its ends secured to the end stands or frames 36. Each of the transverse shafts 33 is connected by beveled gears to a longitudinal shaft 37 mounted in suitable hangers 38 on the several shear frames and driven from any suitable source of power, such as the motor 39. The beveled gears 40, 41 and 42 on the shaft 37 are keyed or otherwise secured thereto so that they can freely slide on said shaft and the shaft bearings also freely slide over the shaft, so that the shaft can remain stationary and not interfere with the shifting of the shear frames.

Beveled gears 43, 44 and 45 on the transverse shafts 33 mesh respectively with the beveled gears 40, 41 and 42. These several sets of gears are of varying sizes, as shown, so that the several transverse shafts 33 are driven at different speeds. These sets of gears are so arranged that the beveled gears on the frame of the first shears 10 give a slow speed to its transverse shaft 33, while those on the frame of the next shears 11 give a higher speed to its transverse shaft, and those on the frame of the next pair of shears 12 give still a higher speed. These gears are so arranged that the speeds of the several shear frames are in ratio of 1, 2, 3, and so forth, in case a larger number of shears are used. Consequently the several shear frames can be shifted simultaneously in either direction, and the second shear frame is shifted through twice the distance of the first shear frame, while the third shear frame is shifted through three times that distance. While therefore the shears are shiftable to vary the distances therebetween, still the several distances between the shears are always uniform. Consequently the plate or bar being sheared is always cut into sections of uniform length.

The shears are provided with a roller table comprising live rollers 48 driven from the shaft 49 by means of a motor 50, as will be readily understood. These rollers are mounted on beams 51 having no connection with the several shear frames, but being secured at their ends to the stands 36.

In front of the shear table is a matcher 53 which may be of any type whereby the sheets are piled one on top of the other and their front and side edges accurately matched. From this matcher the piled sheets pass to the second set of reducing rolls, these being shown as a tandem train composed of four stands of two high rolls 54.

In the use of our apparatus the plate bars are either two, three, or other multiple number of times longer than the ordinary sheet bar, depending upon the number of plates to be piled before passing through the second reducing train. These bars are heated in the furnaces 2 and then passed through the first reducing train, being thereby partially reduced to gage, and emerging upon the roller table 7 as a long plate. The plate is brought to rest by its front end striking against the stops 9. If the several shears are not in proper position, they are brought into such position by rotating the shaft 37, which through the differential bevel gear trains described moves the several shear frames in the required direction and through varying distances, this movement continuing until the last shear of the series is opposite the rear end of the plate on the table 7 so as to cut from said plate the ragged rear or crop end. The shaft 37 is then stopped and the shears are in such position that when the plate is pushed into the same the rear or crop end of the plate is cut off and the remainder of the plate severed into a number of sections of absolutely uniform length. The plate is fed to the shears by the pushers 16 operated by the mechanism described. During the shearing of the plate the rollers 48 of the shear table are at rest. As soon as the plate is sheared the shaft 49 is rotated, thus starting the rollers 48 of the shear table and feeding the several plates into the matcher 53 in which they are automatically piled and their edges matched. The piled plates then pass through the second reducing train, By the use of this apparatus we are enabled to so quickly handle the metal that it can be rolled from a multiple weight sheet bar, that is, a single sheet bar adapted to form a number of plates or sheets of matching thickness to the finished sheets rolled in packs at the same heat. In so doing we are enabled to obtain more even heating, as the single sheet bar of multiple weight, or of weight sufficient to make a number of sheets, can be more evenly heated than a number of ordinary sheet bars. We are also enabled to reduce the labor of feeding, as only one bar is fed through the primary or roughing train as distinguished from two or three in the ordinary continuous train. We can also provide for the quick cutting of the same into sections with minimum loss of scrap, the quick matching of these sections by the longitudinal movement thereof after the shearing, insuring all the plates in the matched pack being of the same length and of uniform edge. All the plates or sheets forming the pack are also of identical heat, as they are formed from the one original sheet bar and they, therefore, draw out more evenly and with minimum loss of scrap. Having so formed the pack it can be quickly rolled down to finished thickness and of uniform gage, and a further reduction obtained than in the ordinary continuous mill where the sheets are rolled to matching thickness from separate sheet bars and the several sheets in the pack vary in heat and are, therefore, liable to draw out to different thicknesses. In the present case the sorting of the sheets for gage, which is necessary in the old practice, can be done away with. Further, as only one crop end is produced for two, three or four plates to be piled together, the amount of scrap produced is never more than one-third of that produced by the old practice, and in many cases not more than one-eighth of the same.

The method illustrated and described in this application is claimed in our application, Serial No. 362,193, filed March 13, 1907.

What we claim is:

1. Plate rolling mechanism comprising in combination and arranged to act in succession in the order named, a primary continuous or tandem reducing train, a plurality of simultaneously operating shiftable cutters spaced uniformly, shifting mechanism therefor arranged to simultaneously vary the distance between the cutters but preserve said distance uniform, longitudinally operating feed mechanism, matching mechanism, and a secondary continuous or tandem reducing train.

2. Plate rolling mechanism comprising in combination and arranged to act in succession in the order named, a primary continuous or tandem reducing train, a table in the line of feed thereof, a shear table adjacent to said roll table, a plurality of simultaneously operating cutters spaced uniformly and located in said shear table, mechanism for pushing the plate sidewise from the roll table into said cutters, and a secondary continuous or tandem reducing train in the line of feed of the shear table.

3. Plate rolling mechanism comprising in combination and arranged to act in succession in the order named, a primary continuous or tandem reducing train, a table in the line of feed of said train, a shear table at the side of said roll table, a plurality of simultaneously operating cutters spaced uniformly and located in said shear table, mechanism for pushing the plate sidewise from the roll table into said cutters, piling and matching mechanism in the line of feed of said shear table, and a secondary continuous or tandem reducing train in the line of delivery of said piling and matching mechanism.

In testimony whereof, we the said MILTON W. HOGLE and WILLIAM W. SLICK have hereunto set our hands.

MILTON W. HOGLE.
WILLIAM W. SLICK.

Witnesses:
ROBERT C. TOTTEN,
J. R. KELLER.